(12) United States Patent
Ziegmann

(10) Patent No.: US 12,492,906 B2
(45) Date of Patent: Dec. 9, 2025

(54) METHOD FOR DETERMINING A PREDICTIVE EGO SPEED OF A VEHICLE TRAVELING ALONG A PREDETERMINED ROUTE, CONTROL DEVICE FOR A VEHICLE OR FOR A NAVIGATION DEVICE OR FOR A MOBILE USER TERMINAL, NAVIGATION UNIT, AND VEHICLE

(71) Applicant: AUDI AG, Ingolstadt (DE)

(72) Inventor: Johannes Ziegmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 90 days.

(21) Appl. No.: 18/523,043

(22) Filed: Nov. 29, 2023

(65) Prior Publication Data

US 2024/0175689 A1    May 30, 2024

(30) Foreign Application Priority Data

Nov. 30, 2022    (DE) .................... 10 2022 131 650.5

(51) Int. Cl.
   *G01C 21/26*    (2006.01)
(52) U.S. Cl.
   CPC .................................... *G01C 21/26* (2013.01)
(58) Field of Classification Search
   CPC . G01C 21/26; B60W 40/105; B60W 2520/10; B60W 2556/45; B60W 2556/50
   USPC ........................................................ 701/500
   See application file for complete search history.

(56) References Cited

U.S. PATENT DOCUMENTS

| | | | | |
|---|---|---|---|---|
| 6,285,950 B1 * | 9/2001 | Tanimoto | ............... | G01C 21/34 701/465 |
| 9,714,023 B2 * | 7/2017 | Kim | .................... | G01C 21/3605 |
| 9,791,294 B2 * | 10/2017 | Rothschild | ....... | G08G 1/096791 |
| 10,895,468 B2 * | 1/2021 | Yang | ................ | G08G 1/096805 |
| 11,590,974 B2 | 2/2023 | Limbacher et al. | | |
| 2011/0050463 A1 * | 3/2011 | Yu | .......................... | G08G 1/133 340/993 |
| 2015/0019122 A1 * | 1/2015 | Wang | .................. | G09B 29/106 701/409 |

(Continued)

FOREIGN PATENT DOCUMENTS

| | | |
|---|---|---|
| CN | 109409571 A | 3/2019 |
| DE | 102008035944 A1 | 4/2010 |
| DE | 102015223733 A1 | 2/2017 |

(Continued)

*Primary Examiner* — Muhammad Shafi
(74) *Attorney, Agent, or Firm* — Sterne, Kessler, Goldstein & Fox P.L.L.C.

(57) ABSTRACT

The present disclosure relates to a method for determining a predictive ego speed of a vehicle traveling along a predetermined route for at least one location or at least one section of the route, by at least determining an average speed currently traveled by road users at the location or the section, determining a first average speed assumed to be the ego speed of the vehicle at this location or this section corresponding to the average speed of traffic density, determining a second average speed assumed to be the traffic density at this location or this section not influencing the ego speed of the vehicle, if the average speed is between the first average speed and the second average speed, determining the predictive ego speed on the basis of the average speed and by means of an interpolation between the first average speed and the second average speed.

16 Claims, 8 Drawing Sheets

(56) References Cited

U.S. PATENT DOCUMENTS

2015/0175015 A1* 6/2015 Lim ................ B60W 10/00
                                                  318/139
2017/0217480 A1* 8/2017 Skellenger .......... B62D 5/0487

FOREIGN PATENT DOCUMENTS

| DE | 102016214822 A1 | 2/2018 |
| DE | 102018123896 A1 | 1/2020 |
| DE | 102020002563 A1 | 9/2020 |

* cited by examiner

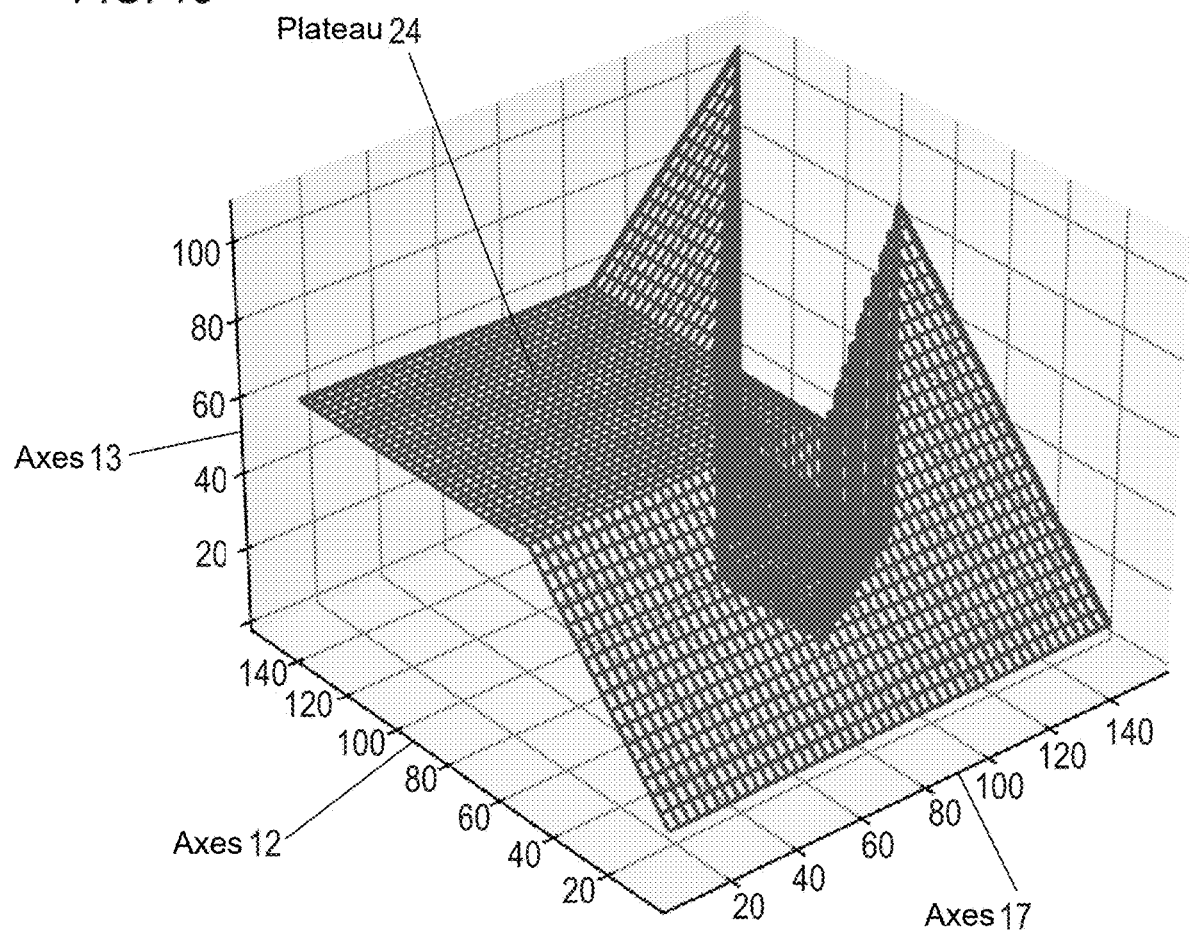

METHOD FOR DETERMINING A PREDICTIVE EGO SPEED OF A VEHICLE TRAVELING ALONG A PREDETERMINED ROUTE, CONTROL DEVICE FOR A VEHICLE OR FOR A NAVIGATION DEVICE OR FOR A MOBILE USER TERMINAL, NAVIGATION UNIT, AND VEHICLE

TECHNICAL FIELD

The present disclosure relates to a method for determining a predictive ego speed of a vehicle traveling along a predetermined route for at least one location or at least one section of the route. The present disclosure further relates to a control device for a vehicle or for a navigation device of a vehicle or for a mobile user terminal. Furthermore, the present disclosure relates to a navigation unit designed as a navigation device for a vehicle or as a mobile user terminal. Lastly, the present disclosure relates to a vehicle.

BACKGROUND

In particular in modern motor vehicles, navigation systems are often used in which a destination position is specified, for example by a driver or by means of an autonomous vehicle guidance, wherein an optimal route from the current location of the vehicle to the destination position is determined. In this case, the predictive profile of the intrinsic speed of the vehicle is often determined, for example in order to determine an anticipated arrival time. The intrinsic speed of the motor vehicle is often referred to as its ego speed. Examples of concepts for determining the predictive ego speed are known from the prior art, for example from DE 10 2015 223 733 A1 and CN 1 09 409 571 A.

BRIEF DESCRIPTION OF THE DRAWINGS/FIGURES

Figure 1:
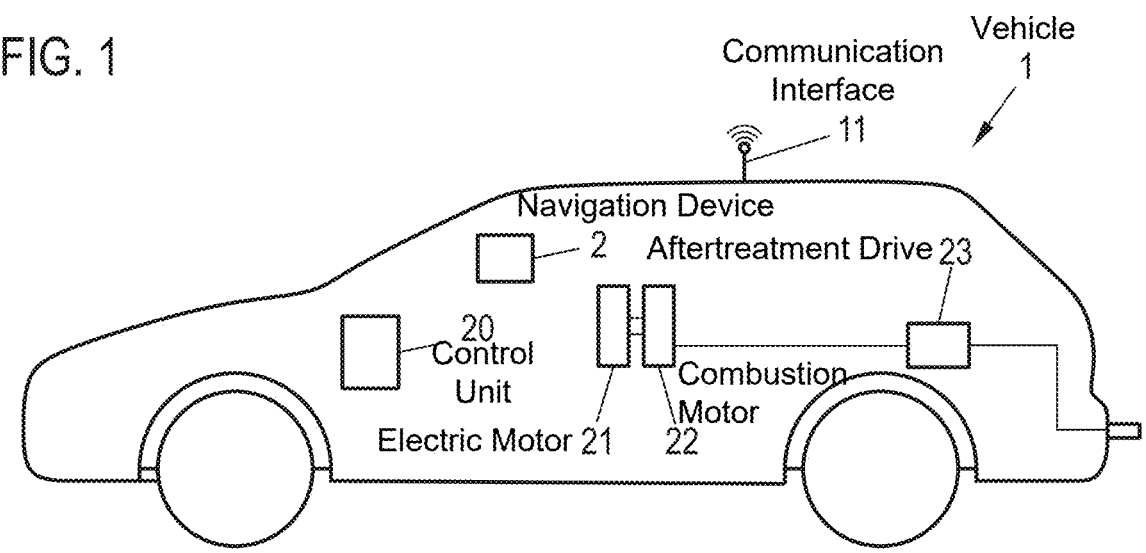
Figure 2:
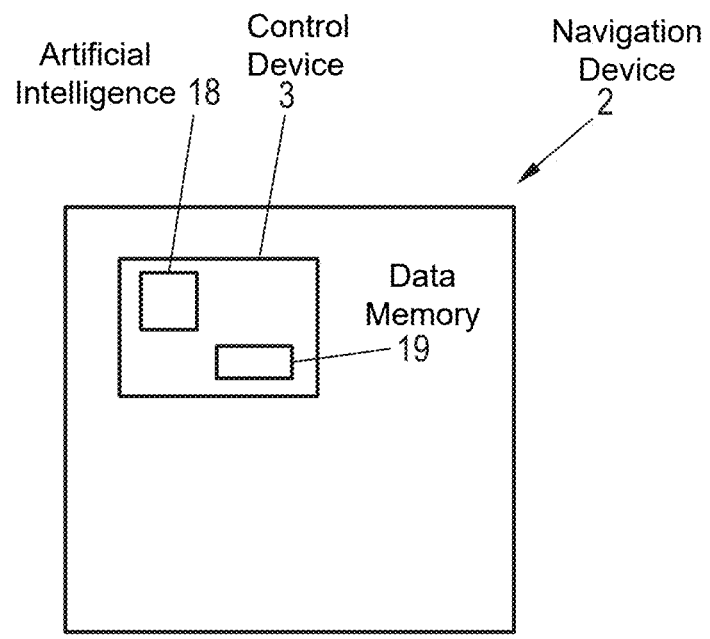
Figure 3:
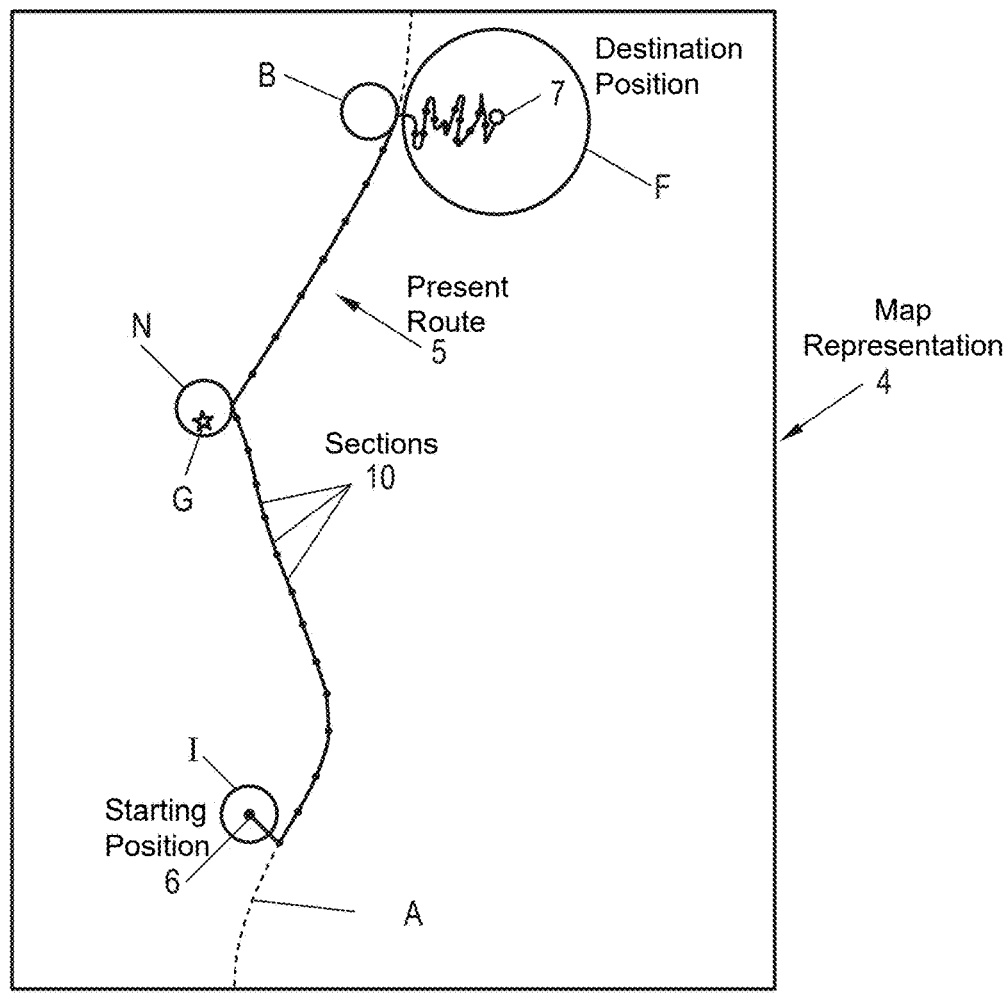
Figure 4:
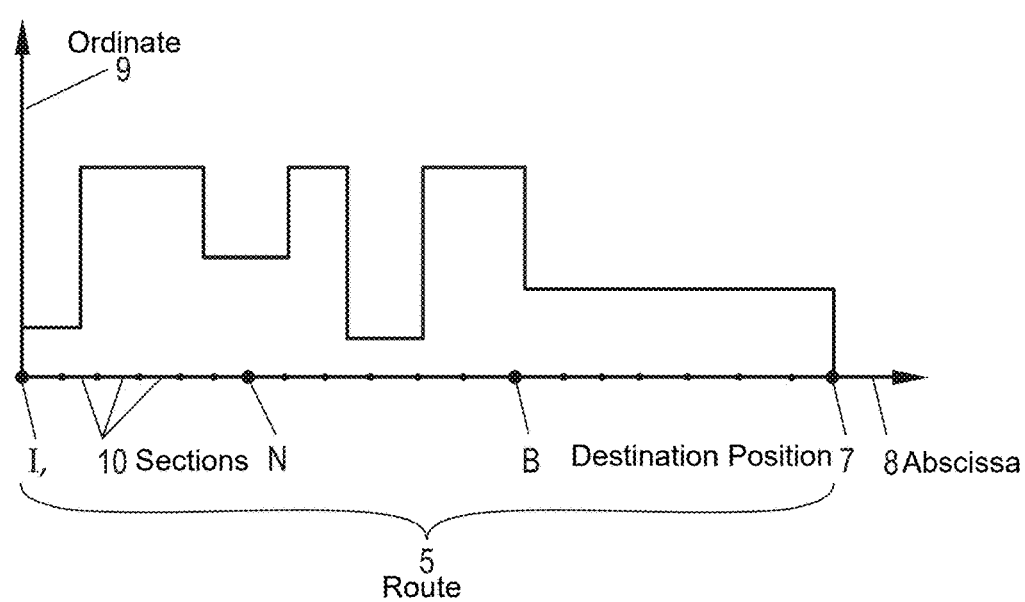

FIG. 1 illustrates a schematic diagram of a motor vehicle, in accordance with an exemplary embodiment.
FIG. 2 illustrates a schematic diagram of a navigation device, in accordance with an exemplary embodiment.
FIG. 3 illustrates schematic diagram of a route, in accordance with an exemplary embodiment.
FIG. 4 illustrates a schematic diagram of a coordinate system, in accordance with an exemplary embodiment.
FIGS. 5-15 illustrates graphical representations of exemplary embodiments.

DETAILED DESCRIPTION

The object of the present disclosure is to specify an improved concept for determining the predictive ego speed.
According to the disclosure, the object is achieved in a method of the type mentioned at the outset in that it comprises the following steps:
determining an average speed currently traveled by road users at the location or the section,
determining a first average speed which is so low that it is to be assumed that the ego speed of the vehicle, at this location or this section, corresponds to the average speed coercively as a result of traffic density,
determining a second average speed that is so high that it is to be assumed that the traffic density at this location or this section does not influence the ego speed of the vehicle,
if the average speed is between the first average speed and the second average speed, determining the predictive ego speed on the basis of the average speed and by means of an interpolation between the first average speed and the second average speed.

It is hereby made possible that, for at least one location or at least one section of the route along which the vehicle is driving, the ego speed is determined predictively or prognostically and as realistically as possible. It is conceivable that the route is determined by means of a navigation unit of the vehicle in that a destination position is specified by a driver and/or by a control unit of the vehicle which is set up for autonomous, in particular fully autonomous, vehicle guidance. In addition, a starting position is specified which, for example, is a current position of the vehicle which is determined, for example, on the basis of a positioning system, in particular on the basis of the GPS system. It is also conceivable that an anticipated starting position is specified by the driver and/or the control unit. Subsequently, in particular by way of the navigation unit, a path that connects the start position and the destination position to one another on the basis of different optimization criteria and that defines the route is determined. This can be, for example, the shortest and/or the fastest and/or the most ecological or most energy-saving path between these positions.

In a preferred embodiment, the route is subdivided into sections that are as small as possible, in particular of equal length. It is also conceivable that point-based, in particular equidistant locations are distributed along the route. With regard to the division of the route into sections or the distribution of the locations, in an advantageous one embodiment of the method according to the present disclosure, it is conceivable that the length of the route sections or the distance between two adjacent locations are different. In particular, it is conceivable that this length or this distance on fast-moving roads, such as a freeway, is greater than in inner-city areas or suburban areas. Subsequently, the predictive ego speed is determined for the sections or locations. This determination can be performed for each of the sections or for each of the locations. However, it is also conceivable that the ego speed is determined only for certain sections or locations, provided this is sufficient for the current purpose in each case. In principle, the predictions determined from the predictive ego speeds, for example a predictive arrival time, are all the better the greater the number of sections or locations used, or the finer the, in particular one-dimensional, section or location grid is. In other words, the prediction accuracy is all the more precise, the more detailed the sections or locations are formed and/or the more extensive the corresponding database is, relative to the section or location grid.

In the method according to one embodiment, an average speed is determined for each of the locations or sections and indicates or corresponds to a speed at which road users are currently traveling, on average, at this location or this section. The average speed can reflect the current traffic situation at the location or the section. In this context, the term "currently" can mean that the average speed is present at the point in time at which it is determined. It is also conceivable that the average speed is not current but predictive in nature and relates to the point in time at which the vehicle is expected to pass the location or the section. Points in time lying between these extreme cases are also conceivable for this purpose. If the average speed is predictive in nature, traffic situations that are expected to be present in the future, for example caused by rush-hour traffic or a large-event taking place in the vicinity of the location or the section, can be taken into account. With regard to the average speed, it is therefore particularly preferred that this is time-dependent.

Furthermore, the first average speed is determined. This represents a fictitious or assumed, in particular calculated, measured or estimated value, which is thus as realistic as possible, for the average speed under the assumption that, due to its low value, the ego speed corresponds to the average speed coercively as a result of the traffic density. In other words, the first average speed is a speed value for the average speed, with the presence of which such a high traffic density is provided that the ego speed corresponds coercively to the corresponding average or congestion speed. Thus, the first average speed relates to the case in which the traffic is so congested at the location or the respective section that an ego speed of the vehicle quicker than the average speed is no longer possible. Corresponding situations are conceivable, for example, in the case of a traffic jam, in which the vehicle is "stuck" in traffic and is "crawling along" with the traffic at the same speed as the other vehicles. The first average speed can also be determined driver-dependently. For example, it is thus conceivable that the first average speed in the case of a rather aggressive driver, making frequent lane changes in heavy traffic, is lower than in the case of a driver who tends to hold back.

In addition, the second average speed is determined. This represents a fictitious or assumed, in particular calculated, measured or estimated value, which is thus as realistic as possible, for the average speed under the assumption that, due to its high value, the traffic density at this location or this section is not influencing the ego speed of the vehicle. Thus, in the case of a correspondingly high average speed, it can be assumed that the traffic is "flowing", so that the vehicles traveling there can drive independently of one another and do not hinder or inhibit one another due to traffic density. The second average speed can also be determined driver-dependently. For example, it is thus conceivable that the second average speed in the case of a more aggressive driver is lower than in the case of a driver who tends to hold back, since they may often still be slowed down noticeably by other road users even at a correspondingly high average speed.

The present disclosure realizes an advantageous possibility of determining the ego speed as realistically as possible if the value of the actually present average speed is between the value of the first average speed and the value of the second average speed. In this case, the traffic density is, on the one hand, so low that in principle a deviation of the ego speed from the average speed is possible. On the other hand, the traffic density is so high that the vehicle cannot drive completely independently of the other vehicles, and the traffic density therefore has a certain or at least significant influence on the ego speed of the vehicle. This influence is clearly all the greater the lower the average speed is, or the closer this is to the first average speed. With this range of the average speed, with regard to the determination of the ego speed, the difficulty exists that the influence of the traffic density on the ego speed can only be described in an extremely complex way via empirical relationships. In order to avoid this problem, according to one embodiment, the interpolation method, which is hardly complex and easy to realize, is used.

According to one embodiment, it is provided that, on the basis of the first average speed and the second average speed, two data points, which can also be referred to as fixed or suspension points, can be determined which are used to carry out the interpolation. Here, the average speed represents the x value and the ego speed represents the y value of the data points. The first average speed is smaller than the second average speed, wherein, in the event that the actual average speed is between these two values, the ego speed to be determined accordingly is calculated by means of the interpolation. The point to be determined here has the actual average speed as the x value and the predictive ego speed as y value, which is determined via the interpolation. For this purpose, instead of a linear interpolation, a non-linear interpolation, for example a spline interpolation, or other interpolation method is equally conceivable.

Since the first average speed relates to the case that the ego speed corresponds to the average speed due to traffic density, it is advantageous in the method according to one embodiment that one of the data points used in the interpolation has the first average speed both as abscissa value and as ordinate value. The abscissa value and ordinate value of this data point are the same. If the average speed is smaller than the first average speed, the predicted ego speed can correspond to the average speed.

It is also provided that the first average speed is the greatest possible value to be assumed for the average speed at which the ego speed of the vehicle corresponds coercively to the average speed. A slightly greater value of the actual average speed than the value used in this embodiment for the first average speed thus already results in an ego speed being possible which deviates from the average speed. This deviation is all the smaller the closer the actual average speed approaches the first average speed from above. In this embodiment, the range for the actual average speed at which the interpolation is carried out is limited downward as far as possible.

Additionally or alternatively, it can be provided that the second average speed is the smallest possible value to be assumed for the average speed at which the traffic density does not influence the ego speed of the vehicle. A slightly smaller value of the actual average speed than the value used in this embodiment for the second average speed thus already results in the traffic density increasing an influence on the ego speed. This influence is all the smaller the closer the actual average speed approaches the second average speed from below. The range for the actual average speed at which the interpolation is carried out is limited upward in this embodiment as far as possible.

According to one embodiment, it can be provided that the first average speed and/or the second average speed is determined on the basis of a predefined, in particular driver-dependent, free travel speed for the location or the section, wherein the free travel speed describes a speed at which road users travel, on average, without traffic obstructions. The free travel speed is dependent on the respective location or the respective section. The free travel speed, on the other hand, is independent of the current traffic situation. The free travel speed is to be understood as the speed at which vehicles travel, on average, at the location or the section if there is no traffic obstruction or no mutual influencing of vehicles caused by a traffic density. The free travel speed can be a speed limit or a corresponding recommended speed present at the respective location or the respective section. The free travel speed thus describes location-specific or section-specific conditions. If the average speed is greater than the free travel speed, the predicted ego speed may correspond to the free travel speed or a corrected value of the free travel speed, as explained further below.

In order to determine the first average speed, an inhibition factor can be determined which specifies a relationship between the free travel speed and the first average speed. The inhibition factor describes how the average speed deviates downward from the free travel speed when the ego speed of the vehicle corresponds to the average speed coercively as a result of the traffic density. The inhibition factor is a location-specific or section-specific value which is determined, for example, on the basis of empirical values for the respective location or the respective section. The inhibition factor can be stored or determined on the vehicle side or can be retrieved via the Internet.

The inhibition factor can be a numerical value from the interval [−1;0], wherein the first average speed is determined from a multiplication of the inhibition factor by the free travel speed and a subsequent addition of the value obtained thereby to the free travel speed. The first average speed therefore deviates more strongly from the free travel speed, the greater the value of the inhibition factor. The extreme case that the inhibition factor has the value −1 means that the first average speed is 0. This means that the ego speed of the vehicle corresponds to the average speed only when the traffic is stationary. The other extreme case that the inhibition factor has the value 0 means that the first average speed is equal to the free travel speed, that is to say that the vehicle is forced as quickly as the other vehicles even when the free travel speed is present.

With regard to the second average speed, it can be provided that it is assumed, in order to determine the same, that it corresponds to the free travel speed. The free travel speed is thereby defined by the fact that, when it is present, the speeds of the road users are not influenced by traffic obstructions, and therefore in particular are not exposed to the influences of traffic density. This definition is in accordance with the definition of the second average speed, since it requires a sufficiently high average speed at which the ego speed is uninfluenced by the traffic density. With knowledge of the free travel speed, the value thereof can thus be assumed as a value for the second average speed.

In order to determine the predictive ego speed, a speed deviation can be determined which specifies an expected driver-specific deviation of the ego speed of the vehicle from the free travel speed. The speed deviation describes or takes into account the individual driving behavior of the respective driver, namely with regard to the ego speed expected to be traveled at by the driver at the location or the section, provided there are no influences caused by traffic density in this case.

It is thus conceivable that a driver with a more sporty driving style is fundamentally traveling faster than the free travel speed, wherein the value of the speed deviation is positive in this case. If the speed deviation is 0, the respective driver is then traveling exactly at a speed which corresponds to the free travel speed. In the case of a driver who holds back and travels slower than the free travel speed, the speed deviation is then negative.

In order to determine the speed deviation, it is typically necessary for the respective driver to be identified; this can be carried out approximately at the beginning of the journey or during the planning of the route. For this purpose, the vehicle can have a driver recognition system, in which the driver is identified, for example, on the basis of camera images and/or fingerprint sensors or the like. The identity of the driver can additionally or alternatively be provided by the driver themself via an input device of the vehicle. When the driver is identified, the speed deviation can be based on empirical values which are stored on the vehicle or a data memory, for example.

If the speed deviation of the individual driver, for example on the basis of historical data and/or predictions or the like, is known, it can be provided in accordance with one embodiment that one of the data points used for the interpolation has the second average speed, in particular the free travel speed, as abscissa value, and the value of the free travel speed deviating by the speed deviation as ordinate value. This approach is particularly expedient because it is assumed that, if the second average speed is present and in particular exceeded, the traffic density is not influencing the ego speed of the vehicle. Accordingly, in this case, the respective driver is expected to be at their preferred speed, which can be determined specifically, as described above, with knowledge of the speed deviation. If the average speed is greater than the free travel speed, the predicted ego speed can correspond to the value of the free travel speed corrected by the speed deviation.

The average speed can be determined in that at least one item of traffic information describing the current or predicted traffic situation is retrieved via the Internet, i.e., in particular "over the air" so to speak. For this purpose, the vehicle or, for example, a mobile user terminal, for example a mobile phone of the driver, can have a communication interface via which a connection to the Internet can be established. The traffic information is provided and retrieved in particular by traffic report services or navigation providers. If the traffic information describes the current traffic situation, this relates to the present point in time, in particular to the determination of the average speed. The traffic information particularly preferably describes the predicted traffic situation. This means that future circumstances, possibly in addition to the current traffic situation, which influence the traffic situation at a location or section at the point in time at which the vehicle will pass there are taken into account. In this way, deviations of the traffic density, attributable to the time of day or rush-hour traffic, and/or large events, such as football games, taking place in the vicinity of the location or the section, can be taken into account.

The average speed can additionally or alternatively be determined in that the at least one item of traffic information describing the current and/or predicted traffic situation is retrieved from at least one further vehicle via a Car-2-Car connection. The traffic information is thus not provided via a third party, but directly by a further road user, who is located at the location or the section at the present moment in time. The further vehicle can transmit its current speed to the vehicle. The average speed may then correspond to this speed or, if a plurality of further vehicles provide the corresponding information, can be determined by averaging these values. Instead of the Car-2-Car connection, an indirect connection of the vehicles is also conceivable, for example via the Internet. In order to form the corresponding connection, the or at least one further communication interface of the vehicle can be provided.

The average speed can additionally or alternatively be determined in that the at least one item of traffic information describing the current and/or predicted traffic situation is based on empirical values and is retrieved from a data memory, in particular a data memory located on the vehicle or external to the vehicle. In this embodiment, the current or predicted traffic situation is not taken into account, but empirical values from the past with respect to the location or the section are used instead. Corresponding data can be continuously detected, stored and updated by the vehicle during its operation, so that said data can be used at later times. Furthermore, it is possible for the average speed to be determined by means of an artificial intelligence that has been trained accordingly.

To determine the first average speed and/or the second average speed, in particular to determine the free travel speed and/or the inhibition factor and/or the speed deviation, a piece of route information can be detected for the location or the section, wherein the route information describes a state and/or road class of the route at this location or this section, in particular depending on the lane of travel. The free travel speed is thus greater, the better the state of the road at the respective location or the respective section. The free travel speed is correspondingly low when a narrow and/or ramped road is present. The route information can have an influence on the inhibition factor and/or the speed deviation, which is taken into account for the corresponding determination of these parameters. The route information can be provided by the navigation unit of the vehicle or can also be retrieved from sources of vehicle outside the vehicle, such as the Internet. It is conceivable that the route information is determined and in particular aggregated within the scope of a so-called Car and/or telephone Floating Data process.

The method according to one embodiment can be used to determine the average speed and/or the first average speed and/or the second average speed by means of artificial intelligence. For example, the values to be determined accordingly, for example the free travel speed and/or the inhibition factor and/or the speed deviation, can be determined by means of the artificial intelligence, in particular on the basis of captured information such as the traffic information and/or the route information and/or the identity of the driver. The artificial intelligence can be implemented on a control device of the motor vehicle, which is also configured in particular to carry out the method according to one embodiment. Specifically, a so-called deep learning engine may be provided, i.e., a technical device with a neural network. The artificial intelligence offers the advantage over fixedly predefined algorithms that dependencies between the parameters to be determined, which are not public and thus cannot be considered within the scope of a fixedly defined algorithm, but nevertheless exist, are determined and correspondingly used. In particular if a very extensive database comprising a plurality of information items captured over a longer period of time is used for generating or determining the parameters to be determined, a data evaluation based on artificial intelligence, for example for realizing a so-called Delta-Mining process, can be extremely effective and can deliver realistic results.

The artificial intelligence can be trained by means of suitable training data records prior to the actual use in the motor vehicle. These data records may comprise information which has been detected over a longer period of time and on the basis of which the artificial intelligence generates corresponding parameters. These results are compared with parameters actually present and are checked with respect to their consistency so that a continuous learning process of the artificial intelligence takes place. It is additionally or alternatively conceivable that the artificial intelligence is trained during the actual use in the vehicle, namely on the basis of the real data or information. This offers the advantage that the evaluation of the corresponding information can take place specifically with regard to the driver of the vehicle.

Thus, within the scope of determining the parameters required for carrying out the method according to one embodiment, it can be provided that an initial value is firstly assumed for the corresponding parameter, wherein, if it should be found that this value deviates considerably from reality, a corresponding new learning of this parameter on the part of artificial intelligence takes place.

With regard to the determination of the average speed and/or the first average speed and/or the second average speed and/or the route information, and the values to be determined accordingly, for example the free travel speed and/or the inhibition factor and/or the speed deviation, it can be provided that a distinction between different lanes of the route is carried out here in the respective section or at the respective location. In this case, situations can thus also be detected and taken into account realistically if there are different traffic conditions in different lanes, for example if an accident or a ban on overtaking is present in one of the lanes. The average speed in the event of the overtaking ban for trucks in the right-hand lane can thus be significantly lower than in the left-hand lane or the other lanes, in which, if necessary, even an average speed, which can correspond to the free travel speed or is greater than the latter, can be present.

A plurality of optional developments or specific applications of the method according to one embodiment are explained below, by means of which the predictive ego speed determined according to one embodiment is supplied for a specific intended use in each case. The predictive ego speed can thus be used to determine a predictive time of arrival. In this embodiment, the predictive ego speed on the part of the, or a, navigation unit of the vehicle is therefore used to determine the expected journey time until arrival at the destination position. In particular for this purpose, the predictive ego speed is determined for the entire route, in particular without gaps, so that the corresponding journey time can be determined on the basis of the resulting profile of the predicted ego speed.

The predictive ego speed can be used to predict an energy consumption of the vehicle. The predictive ego speed, in particular together with the route information describing a local gradient of the route, can thus be used by means of the control device or the control unit in order to determine the power required at the location or the section by a drive motor.

The applications conceivable in conjunction with the prediction of the energy consumption are diverse. If the drive motor is an electric motor, the required power supply of a traction battery of the vehicle at the location or the section can be determined. Depending on this, required charging stops of the vehicle for charging the traction battery can be planned and/or the range of the vehicle achievable without stopping can be predicted. Furthermore, the implementation of a so-called Thermo Management is possible, in which a temperature conditioning of the traction battery takes place, in particular since its intrinsic temperature is dependent on the current power output.

Additionally or alternatively, the predictive ego speed can be used to control an exhaust gas aftertreatment device of the vehicle. Thus, required heating and/or regeneration cycles of the exhaust gas aftertreatment device can be planned. Additionally or alternatively, the predictive ego speed can be used to control an intermittent operation of a combustion motor and an electric motor of the vehicle designed as a hybrid vehicle. The intermittent operation is understood to mean the alternating operation of the combustion and electric motors of the vehicle designed as a hybrid vehicle, wherein corresponding switch-on and switch-off processes of the motors are controlled to increase the energy efficiency.

The present disclosure also relates to a control device for a vehicle or for a navigation device of a vehicle or for a mobile user terminal, wherein the vehicle or the navigation device or the user terminal has at least one communication interface, by means of which a communication link for detecting an average speed for at least one location or at least one section of a predefined route along which the vehicle is traveling can be established, wherein the control device is set up to carry out the method according to the above description. The communication interface can be provided for establishing a wireless connection to an external server and/or the Internet. All advantages and features explained in conjunction with the method according to present disclosure can be transferred to the control device according to another embodiment, and vice versa.

The disclosure further relates to a navigation unit designed as a navigation device for a vehicle or as a mobile user terminal, in particular as a Smartphone or as a mobile phone, wherein the navigation unit is a control device according to the above passage of the description. All features and advantages explained in conjunction with the method according to the present disclosure and/or the control device according to the present disclosure are equally transferable to the navigation unit according to the present disclosure, and vice versa.

The present disclosure also relates to a vehicle, in particular a land-based motor vehicle, comprising a control device according to the above passage of the description or a navigation unit designed as a navigation device according to the above passage of the description. All advantages and features explained in conjunction with the method according to the present disclosure and/or the control device according to the present disclosure and/or the navigation unit according to the present disclosure are equally applicable to the vehicle according to the present disclosure, and vice versa.

FIG. 1 illustrates a vehicle 1 according to the present disclosure in accordance with an exemplary embodiment. The vehicle 1 is a motor vehicle or a passenger car and comprises a navigation unit according to one embodiment, i.e., a navigation device 2, according to an exemplary embodiment, which is shown in an extremely schematic manner in FIG. 2. The navigation device 2 comprises a control device 3 according to another embodiment which is set up to carry out the method according to the present disclosure. A specific exemplary embodiment of this method is explained below. The control device 3 can alternatively be a component of the vehicle 1. The navigation unit comprising the control device 3 can be a mobile user terminal, for example a Smartphone or mobile phone, by means of which a communication link can be formed with the navigation device 2 of the vehicle 1.

FIG. 3 illustrates a map representation 4 of a present route 5 along which the vehicle 1 is about to travel. The map representation 4 is displayed to a driver of the vehicle 1, for example via a display device of the navigation device 2.

The route 5 is determined on the basis of a starting position 6, which is the current location of the vehicle 1, and a predefined destination position 7. The starting position 6 is specified by way of example by the navigation device 2 via a GPS signal, and the destination position 7 by the user via a user input. Merely for illustration purposes, the route 5 relates to a journey of the vehicle 1 from Ingolstadt I to the Fichtel mountains F, which the driver is about to start as a day trip. The route 5 initially leads from Ingolstadt I to a freeway A, wherein the city of Nuremberg N is then passed. The journey along the freeway A ends at the city of Bayreuth B, wherein the subsequent route section leads with some winding roads to the destination position 7 in the Fichtel mountains F.

The aim of the method is to provide a predictive ego speed $v_{res}$ of the vehicle 1 for the route 5 that has been determined as the fastest route between the positions 6, 7 by means of the navigation device 2. of which the corresponding result is shown in FIG. 4, in which a coordinate system is shown, the abscissa 8 corresponds to the route 5 and the ordinate 9 of which corresponds to the predictive ego speed $v_{res}$ of the vehicle 1 at the respective positions of the route 5. Here, the predictive ego speed $v_{res}$ is to be determined as realistically as possible.

For this purpose, the route 5 is subdivided into sections 10, wherein alternatively point-based locations of the route 5 can be defined. The length of the sections 10 is shown overly large in FIGS. 3 and 4, wherein, in principle, the result for the ego speed $v_{res}$ is all the more precise and better, the greater the number of such sections 10 that are specified or the shorter these are.

In the method according to one embodiment, an average speed $v_{av}$ currently traveled at, on average, by road users is first of all determined, moreover separately for each of the sections 10. For this purpose, traffic information describing the current traffic situation and which is provided in particular by so-called "Traffic Providers" is retrieved from the Internet, which describes the present traffic situation, i.e., in particular traffic jam and/or traffic obstructions currently present. This detection is performed via a communication interface 11 of the vehicle 1, by means of which a wireless communication link is formed. The communication interface 11 can also be provided on the part of the navigation unit.

With regard to the detection of the traffic information, it is additionally or alternatively provided that the vehicle 1, in particular via the detection device 11, establishes Car-2-Car connections, wherein information regarding their current speeds of further vehicles currently located in the respective sections 10 is provided by said further vehicles. The average speed $v_{av}$ for each of the sections 10 is determined via an averaging of the speeds of the vehicles located in the respective section 10.

It is conceivable that the traffic information is additionally or alternatively retrieved from a data memory 19, in particular a data memory in the vehicle, wherein the traffic information is based on empirical values. However, the detection of the traffic information via the Internet and/or via the Car-2-Car connections is advantageous insofar as it takes into account the actual, current traffic situation.

Based on FIG. 4, the traffic information is reflected in that a traffic jam or heavy traffic currently present between Nuremberg N and Bayreuth B on the freeway A, in which, for example, only so-called "stop-start" travel is possible, is taken into account. Thus, the traffic information indicates that a low average speed $v_{av}$ is present in the sections 10 of the affected part of the route 5, so that the predicted ego speed $v_{res}$ there is also correspondingly low.

With regard to the traffic information, a predicted traffic situation is also taken into account in addition to the current traffic situation. Thus, in the example shown, it is known from the traffic information that, at the future point in time at which the vehicle 1 is expected to pass Nuremberg N, a large event G, such as a football game, will be taking place, so that in the region of the route 5 on the freeway A in the vicinity of Nuremberg N, a higher traffic volume and thus a lower average speed $v_{av}$ can be expected. The large event G is also noticeable in the graph of FIG. 4 by correspondingly low values for the ego speed $v_{res}$ in the affected sections 10 in the vicinity of Nuremberg.

Furthermore, route information for each of the sections 10 is detected, describing a state and a road class of the route 5 at the respective section 10. The route information specifies, for the sections 10 located in Ingolstadt I, that these are narrow roads with typically many obstacles such as parked vehicles. The route information specifies for the sections 10 lying on the freeway A that this is a three-lane and substantially straight freeway in a very good state. The route information specifies for the sections 10 located in the Fichtel mountains F that these are curved roads, possibly in a poor state.

Figure 5:
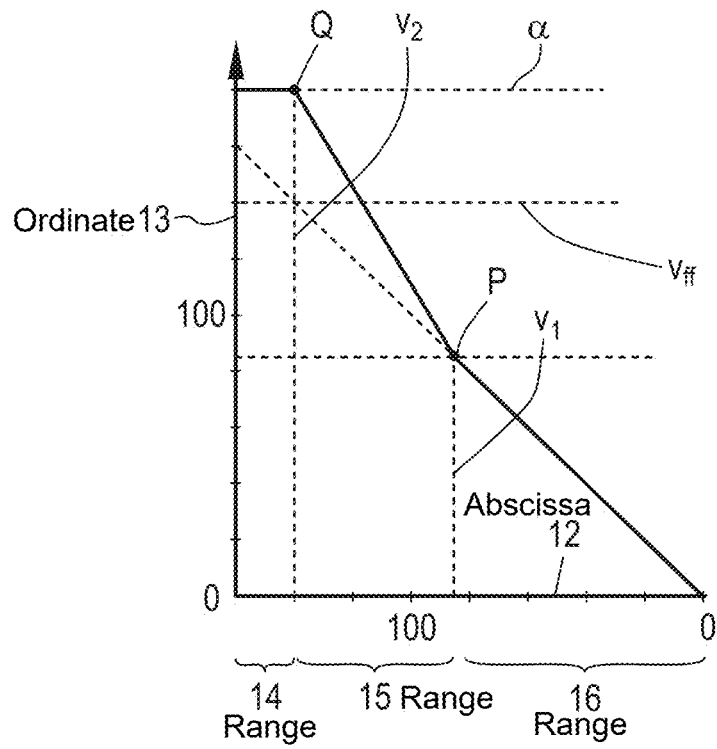

Specific details are explained below as to how the results shown in FIG. 4 for the ego speed $v_{res}$ are determined within the scope of the explained exemplary embodiment on the basis of the previously detected average speed $v_{av}$ and the route information. For this purpose, reference is first made to FIG. 5, which shows a coordinate system which corresponds to the relationship between the predictive ego speed $v_{res}$ and the average speed $v_{av}$, specifically for one of the sections 10, by way of example. The abscissa 12 of the coordinate system relates to the average speed $v_{av}$ with values increasing to the right, and the ordinate 13 to the resulting ego speed $v_{res}$ with values increasing upward. This relationship is illustrated in FIG. 5 by the solid line in the coordinate system.

To determine the predictive ego speed $v_{res}$ a case distinction is carried out, in which ranges 14, 15, 16 for the average speed $v_{av}$ are distinguished. In the range 14, the average speed $v_{av}$ is so high that it can be assumed that the traffic density is not influencing the ego speed $v_{res}$ of the vehicle 1. In relation to FIGS. 3 and 4, this is the case, for example, immediately after the vehicle 1 has joined the freeway A. In the range 16, the average speed $v_{av}$ is so low that the vehicle 1 is traveling coercively at an ego speed $v_{res}$ corresponding to the speed $v_{av}$ of the other road users. In relation to FIGS. 3 and 4, this is then the case when the vehicle 1 is in the traffic jam on the freeway A between Nuremberg N and Bayreuth B. The range 15 is the boundary range or intermediate range between the two ranges 14, 16. For example, it can be assumed in the range 15 that the average speed $v_{av}$ on the one hand is so low that the vehicle 1 cannot drive at its actual preferred speed, wherein the average speed $v_{av}$ on the other hand, however, is so high that the vehicle 1 does not coercively have to travel at the same speed $v_{av}$ as the other vehicles. In other words, the average speed $v_{av}$ in the range 15 is such that, although the vehicle 1 can indeed drive faster than the other vehicles, due to the present traffic density the other vehicles still have an influence on the vehicle 1, so that the latter cannot drive at its actual preferred speed.

In the following, it is explained with reference to FIG. 5 how the boundaries of the ranges 14, 15, 16 are determined. One of these boundaries is denoted as a first average speed $v_1$ which forms the interface located between the ranges 15 and 16 and still belonging to the range 16. The other boundary is denoted as a second average speed $v_2$ which forms the interface located between the ranges 14 and 15 and still belonging to the range 14. In FIG. 5, these interfaces are marked by dashed vertical lines.

First, a predetermined free travel speed $v_{ff}$ is determined for each of the sections 10. This describes the speed traveled on average by road users without traffic obstructions in the respective section 10 under the assumption that the traffic density is so low that the vehicles do not influence one another with respect to their speeds. The free travel speed $v_{ff}$ is therefore independent of the current traffic situation. The free travel speed $v_{ff}$ corresponds, for example, to the value of a speed limit present in the respective section 10 or a corresponding recommended speed. Additionally or alternatively, the free travel speed $v_{ff}$ is dependent on physical conditions in the respective section 10, wherein, for example, it is taken into account that the free travel speed $v_{ff}$ in curved sections 10 is fundamentally lower than on straight route sections. The free travel speed $v_{ff}$ can be retrieved via the communication interface 11, for example from the Internet, and/or can be determined via an artificial intelligence 18 implemented by the control device 3, in particular with the inclusion of the route information. In FIG. 5, the determined free travel speed $v_{ff}$ is shown as a horizontal line, which has, by way of example, the value 140 km/h for the affected section 10. This is the case, for example, on a section 10 of the freeway A on which no speed limit is given.

To determine the first average speed $v_1$, an inhibition factor $\gamma_\beta$ defining a relationship between the free travel speed $v_{ff}$ and the first average speed $v_1$ is determined for the corresponding section 10 in addition to the free travel speed $v_{ff}$. The inhibition factor $\gamma_\beta$ can also be retrieved via the communication interface 11 and/or determined by means of the artificial intelligence 18. Specifically, and by way of example, the inhibition factor $\gamma_\beta$ is a numerical value from the range [−1;0], wherein the first average speed $v_1$ is determined from a multiplication of the inhibition factor $\gamma_\beta$ by the free travel speed $v_{ff}$ and subsequent addition of the value thereby obtained to the free travel speed $v_{ff}$, i.e., on the basis of the formula $$v_1 = v_{ff} + \gamma_\beta \cdot v_{ff} = v_{ff}(1 + \gamma_\beta).$$

In the situation shown in FIG. 5, it is also assumed that the inhibition factor $\gamma_\beta = -0.4$. Consequently, the first average speed $v_1$ equals 60% of the free travel speed $v_{ff}$, i.e., $v_1 = 84$ km/h. This means that the vehicle 1, with an actual average speed $v_{av}$ of 84 km/h or less, is traveling coercively as a result of the traffic density at an ego speed $v_{res}$ corresponding to the average speed $v_{av}$.

To determine the second average speed $v_2$ it is assumed that this corresponds to the free travel speed $v_{ff}$. The definition of the free travel speed $v_{ff}$ corresponds in principle to the second average speed $v_2$, since this presupposes a sufficiently high average speed $v_{av}$ so that the ego speed $v_{res}$ is uninfluenced by the traffic density. Thus, the value for the free travel speed $v_{ff}$ is assumed directly as the value for the second average speed $v_2$.

Regarding the determination of the average speed $v_{av}$ and the first average speed $v_1$ and the second average speed $v_2$, i.e., the values of the free travel speed $v_{ff}$ and inhibition factor $\gamma_\beta$ to be determined in this context and of a driver-specific speed deviation $v_\Delta$ explained in greater detail below, and also of the route information it is provided that a distinction of different lanes of the route 5 in the respective section 10 or at the respective location is carried out here. In this way, situations in which different traffic conditions are present in different lanes are also detected realistically and taken into account.

In the exemplary embodiment described, the determination of the average speeds $v_1$, $v_2$ just described means that the first average speed $v_1$ takes on the greatest possible value to be assumed for the average speed $v_{av}$ at which the ego speed of the vehicle corresponds coercively to the average speed $v_{av}$, and that the second average speed $v_2$ takes on the smallest possible value to be assumed for the average speed $v_{av}$ at which the traffic density has no influence on the ego speed of the vehicle 1. The range 15 relating to the average speed $v_{av}$, in which the ego speed $v_{res}$ is determined by means of the interpolation and thus approximately, is thus selected to be as small as possible or as narrow as possible, so that the two regions 14, 16, in which the ego speed $v_{res}$ is not determined by means of this approximation method, are as broad as possible. Again referring to FIG. 5, it is explained below how, in the ranges 14, 15, 16, using the previously determined results, the predicted ego speed $v_{res}$ is specifically determined.

With regard to the range 14, a predicted driver-specific speed deviation $v_\Delta$ is determined for each of the sections 10. The speed deviation $v_\Delta$ is a measure of whether the driver is a driver with a sporty driving style, who drives more quickly than the vehicles in their surroundings, or a driver who holds back and drives more slowly than their surroundings. Specifically, the speed deviation $v_\Delta$ describes a predictive deviation of the ego speed of the vehicle 1 from the free travel speed $v_{ff}$ for the respective section 10 without traffic obstructions and without influences due to a high traffic density. If the value for the speed deviation $v_\Delta$ is positive, then the driver is on average faster than the free travel speed $v_{ff}$. If the value for the speed deviation $v_\Delta$ is negative, then the driver is driving, on average, more slowly than the free travel speed $v_{ff}$.

To determine the speed deviation $v_\Delta$, the identity of the driver is determined, for example at the beginning of the journey or during the route planning. For this purpose, the vehicle 1 has a driver recognition system (not shown in the figures), in which an identification of the driver takes place on the basis of camera images and/or fingerprint sensors. The identity of the driver can additionally or alternatively be provided by the driver themself via an input device of the vehicle 1. The speed deviation $v_\Delta$ is determined by means of the artificial intelligence 18 on the basis of the driver's identity and the values and information additionally detected. If no driver detection is provided or possible, a vehicle-specific and driver-independent value for the speed deviation $v_\Delta$ can also be used as a basis.

For the example shown in FIG. 5, it is assumed that $v_\Delta$=+40 km/h, that is to say that the driver of the vehicle 1 is traveling, on average, 40 km/h more quickly than the free travel speed $v_{ff}$. The free travel speed $v_{ff}$ corrected by the speed deviation $v_\Delta$ is shown in FIG. 5 as a dashed horizontal and is denoted $\alpha$, wherein it is true that $$\alpha = v_{ff} + v_\Delta.$$

This calculation provides the result $\alpha$=180 km/h.

In the range 14, there is the case that the average speed $v_{av}$ is greater than the free travel speed $v_{ff}$. Therefore, it can be assumed for this range 14 that the driver can drive at their preferred speed $\alpha$, so that, for the range 14, it is true that $$v_{res} = \alpha.$$

Based on FIGS. 3 and 4, the range 14 applies to those sections of the freeway A which are not affected either by the traffic jam between Nuremberg N and Bayreuth B or by the large event G.

For the range 16, the average speed $v_{av}$ is in any case smaller than the first average speed $v_1$, so that the ego speed $v_{res}$ corresponds coercively to the detected average speed $v_{av}$. Thus, for the range 16 it is true that $$v_{res} = v_{av}.$$

Based on FIGS. 3 and 4, the range 16 applies for the section of the freeway A, which is affected by the traffic jam or heavy traffic between Nuremberg N and Bayreuth B and in which the traffic is flowing only extremely slowly.

In the range 15, in which the detected average speed $v_{av}$ lies between $v_1$ and $v_2$, the predictive ego speed $v_{res}$ is determined by means of the interpolation between the first ego speed $v_1$ and the second ego speed $v_2$. For this purpose, the coordinates of two data points P, Q are first determined, on the basis of which the interpolation is carried out. With regard to the determination of the coordinates of the data point P, the first average speed $v_1$ corresponds to the abscissa value or the x-coordinate of the data point P. Since the first average speed $v_1$ lies in the range 16, the ordinate value or the y-coordinate of the data point P for $v_{res}$ is at the point $v_1$, so that $P(v_1|v_1)$. With regard to the determination of the coordinates of the data point Q, the second average speed $v_2$ corresponds to the abscissa value or the x-coordinate of the data point Q. Since the second average speed $v_2$ is located in the range 14, the ordinate value or the y-coordinate of the data point P for $v_{res}$ lies at the point $v_2$, so that Q $(v_2|\alpha)$ and thus $Q(v_2|v_{ff}+v_\Delta)$.

Based on a linear interpolation, the predictive ego speed $v_{res}$ results in the range 15 for $$v_{res} = -\frac{-\gamma_\beta \cdot v_{ff} + v_\Delta}{\gamma_\beta \cdot v_{ff}} \cdot (v_{av} - v_{ff}) + v_{ff} + v_\Delta.$$

The interpolation carried out in the range 15 thus represents an approximation method by means of which the predictive speed $v_{res}$ is determined in the second range 15, which is difficult to describe or model. Instead of the linear interpolation, a non-linear interpolation, for example a spline interpolation, or other interpolation method is equally conceivable. Based on FIGS. 3 and 4, the range 15 applies to the section of the freeway A in the vicinity of Nuremberg N, in which there is indeed an increased traffic density due to the large event G, but not a traffic jam.

Figure 6:
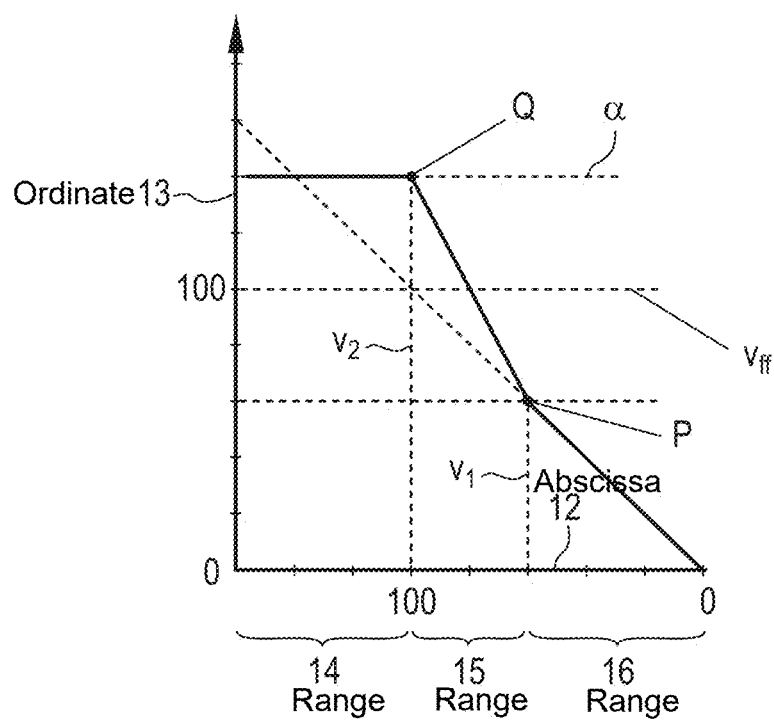
Figure 7:
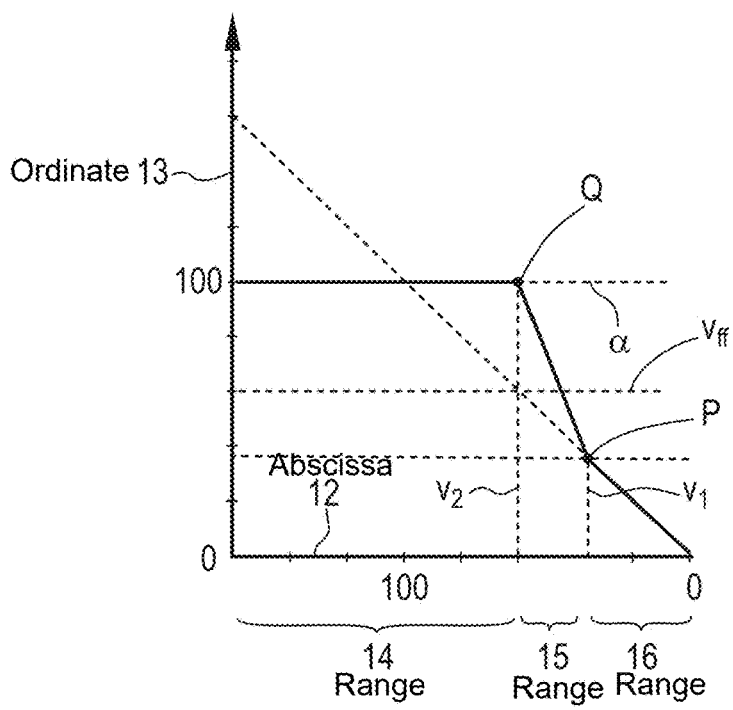
Figure 8:
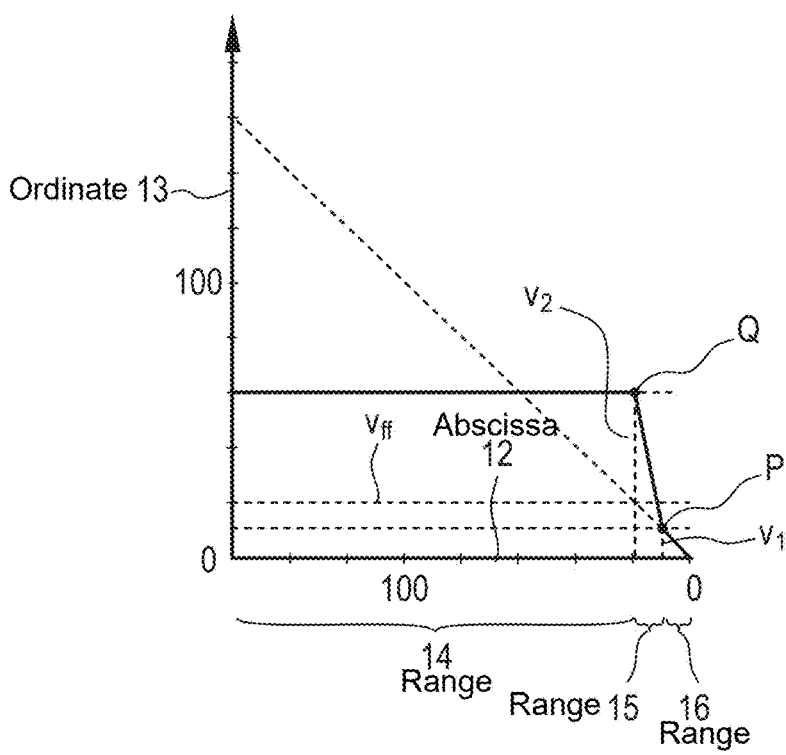
Figure 9:
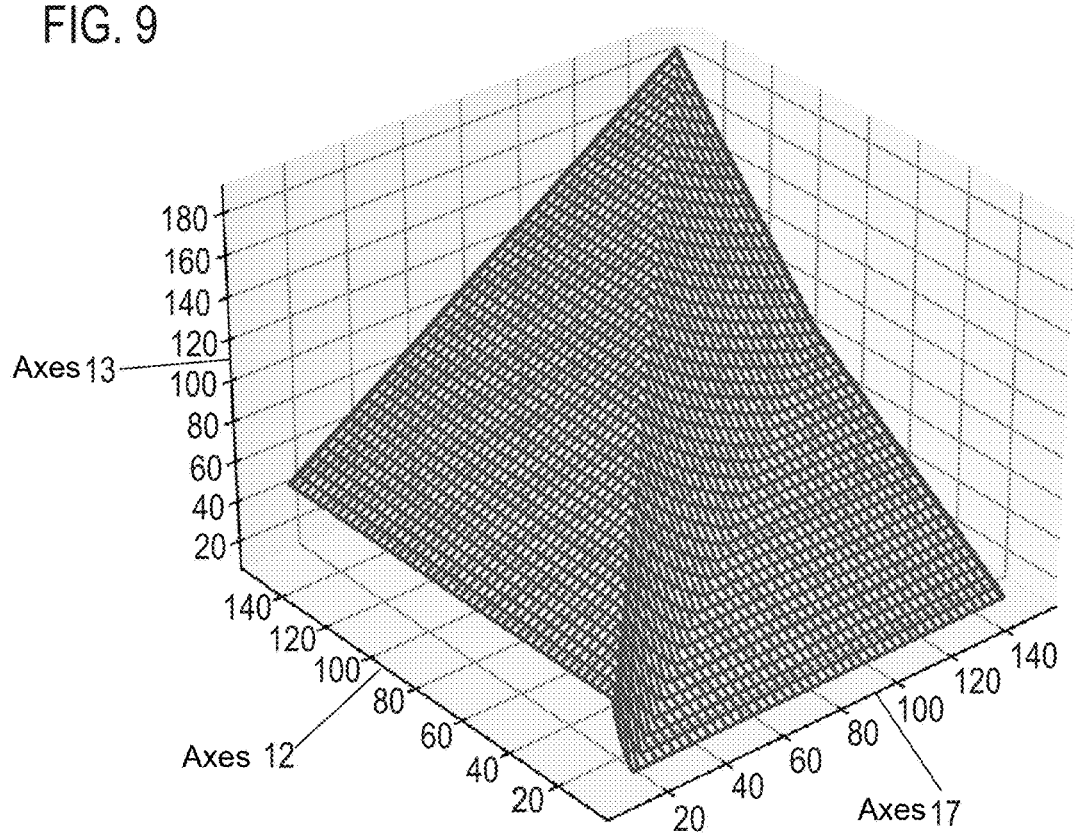
Figure 10:
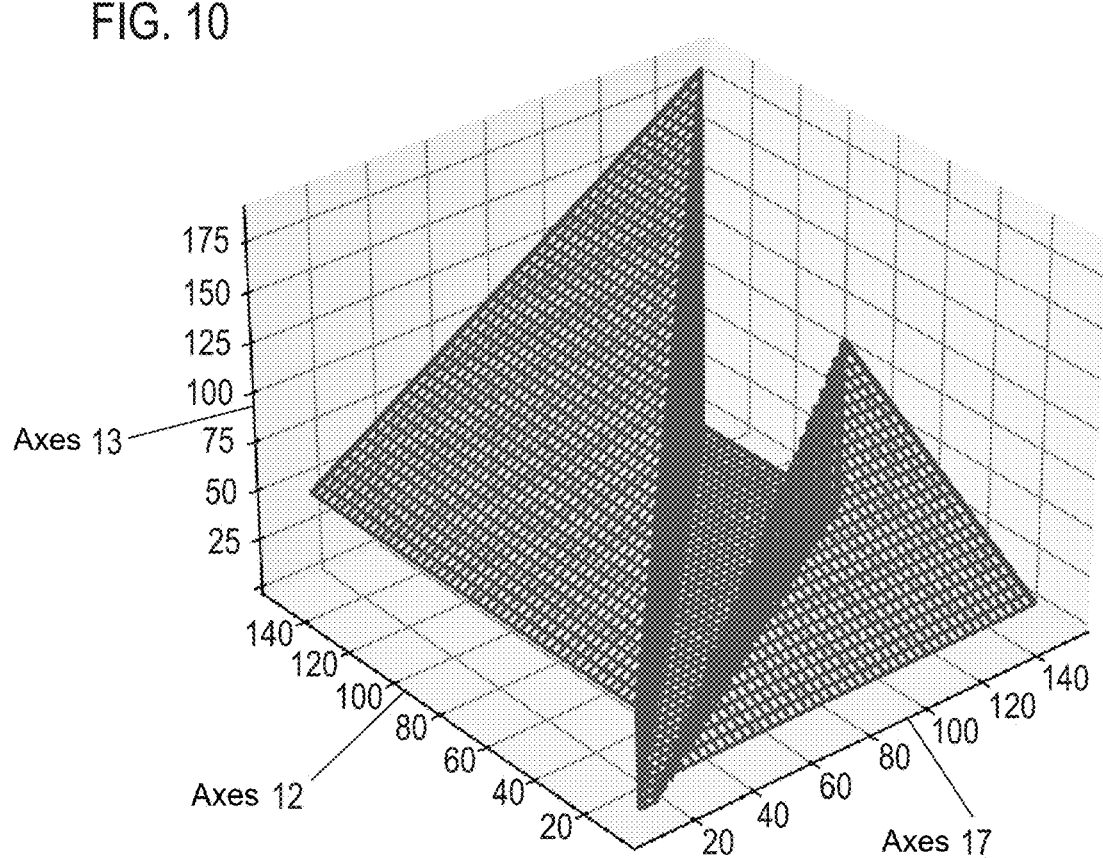
Figure 11:
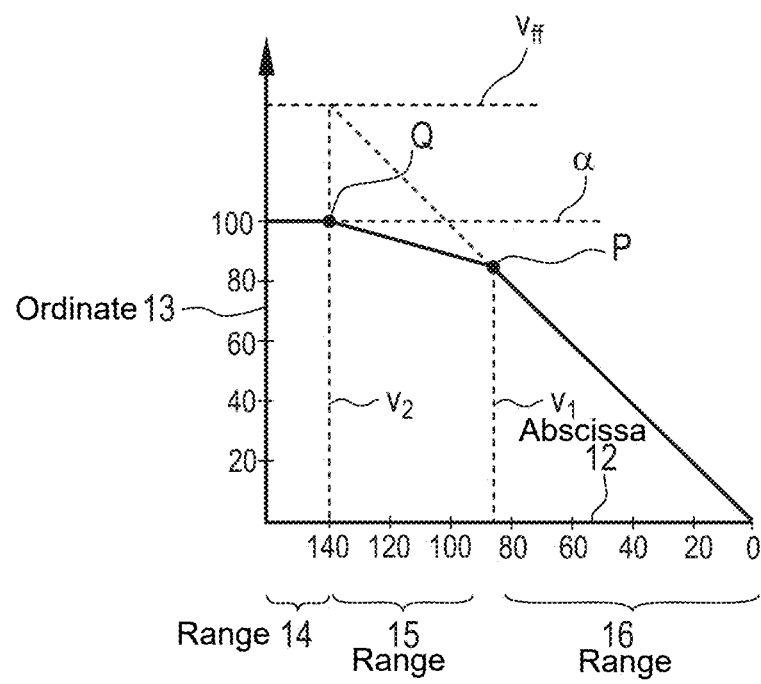
Figure 12:
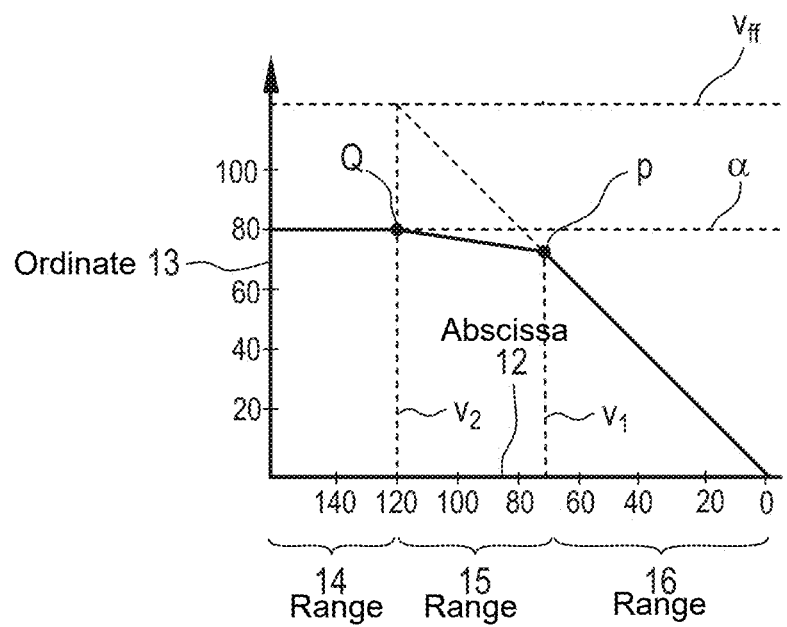
Figure 13:
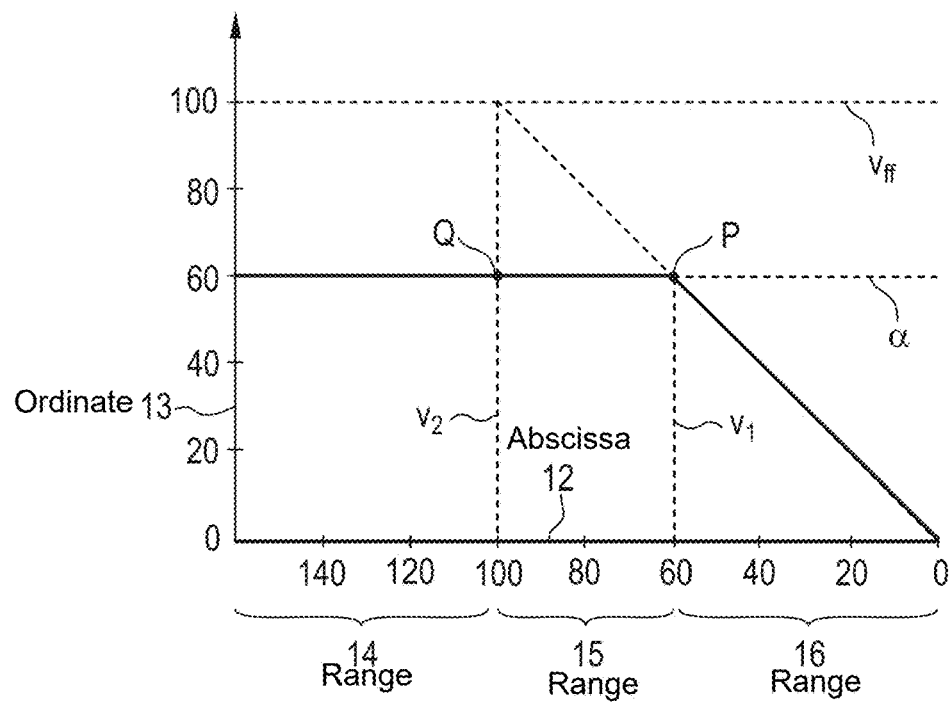

For better understanding of the procedure just explained, FIGS. 6, 7 and 8 each show coordinate systems corresponding to the coordinate system of FIG. 5, wherein in FIG. 6 $v_{ff}$=100 km/h, in FIG. 7 $v_{ff}$=60 km/h and in FIG. 8 $v_{ff}$=20 km/h. Thus, the situation shown in FIG. 5 applies, for example, for free sections of the freeway A, the situation shown in FIG. 6 applies for example for country roads, and the situation shown in FIG. 7 applies for example for the winding route in the Fichtel mountains F. In addition, FIGS. 9 and 10 each show a three-dimensional coordinate system, wherein the further axis 17 is shown in addition to the axes 12, 13, relating to the values for the free travel speed $v_{ff}$. Merely for better visibility of the ranges 14, 15 and 16 are the values for $v_{res}$ in FIG. 10 in the range 15 in which the interpolation takes place set to 0.

Further cases in conjunction with the performance of the method according to the present disclosure according to the above exemplary embodiment will be explained below with reference to FIGS. 11-15. In this case, FIGS. 11-13 correspond to FIGS. 5-8 and FIGS. 14 and 15 correspond to FIGS. 9 and 10. In FIGS. 11-15, it is assumed that $v_A=-40$ km/h and that $\gamma_\beta=-0.4$. For FIG. 11, it is assumed that $v_{ff}=140$ km/h, for FIG. 12 that $v_{ff}=120$ km/h, and for FIG. 13 that $v_{ff}=100$ km/h.

A clear difference from the cases explained with reference to FIGS. 5-10 is that $\alpha$, i.e., the value of the free travel speed $v_{ff}$ corrected by the speed deviation $v_A$, is always below the value for the free travel speed $v_{ff}$. In this case, the boundary case can occur in which the values for the ego speed $v_{res}$ belonging to the two average speeds $v_1$, $v_2$ are the same. This boundary case shown in FIG. 13 occurs when $v_A=\gamma_\beta \cdot v_{ff}$. If $v_A<\gamma_\beta \cdot v_{ff}$ and consequently $v_{av}>(v_A/\gamma_\beta)\cdot(1+\gamma_\beta)$, it is assumed, in particular in order to prevent discontinuities at the ego speed $v_{res}$, that $$v_{res} = \frac{v_A}{\gamma_\beta} \cdot (1+\gamma_\beta),$$

wherein in the other cases the ego speed $v_{res}$ is calculated to be $$v_{res} = v_{av}.$$

Figure 14:
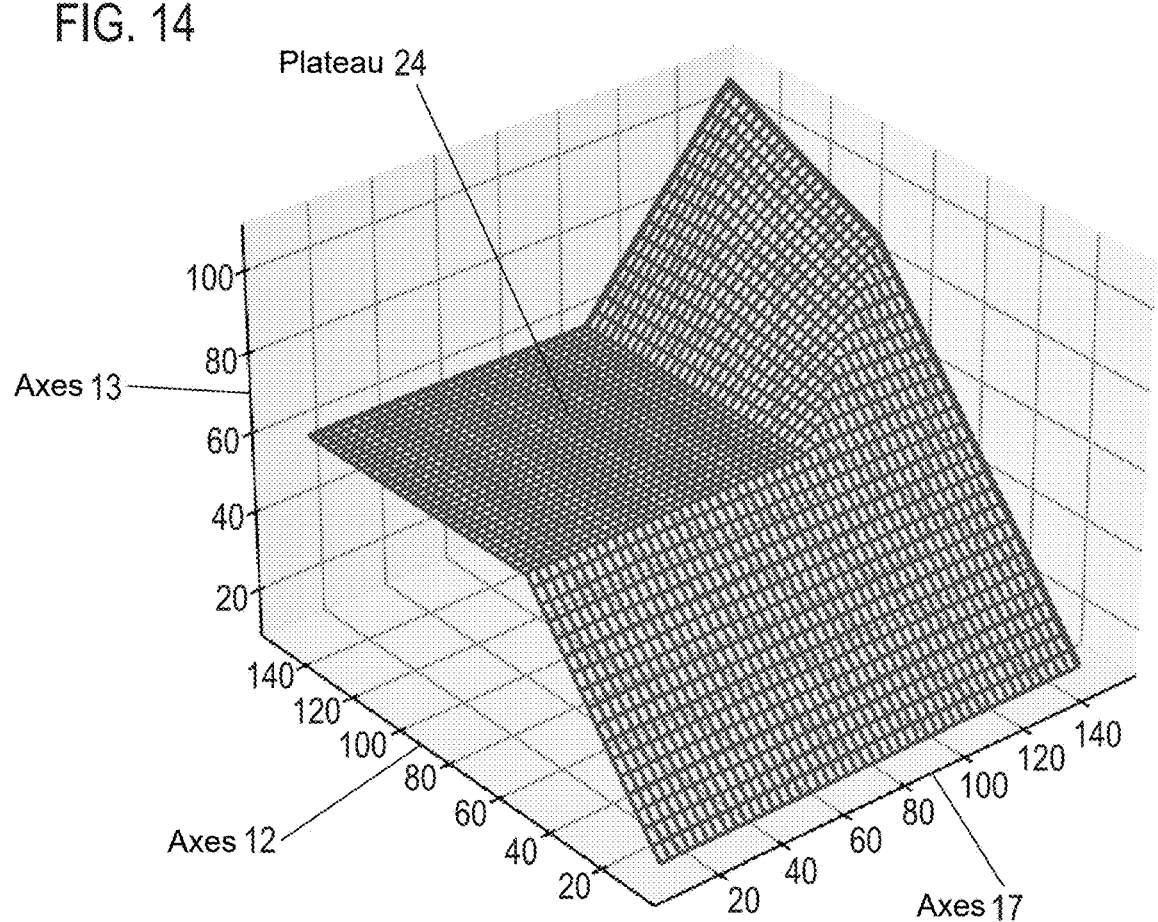

The plateau 24, which can be seen in FIG. 14, is hereby formed so that no discontinuities occur at the interfaces.

In summary, the calculation of the ego speed $v_{res}$ is provided by the following formula $$v_{res} = \begin{cases} v_A + v_{ff}, & \text{if } v_{ff} < v_{av} \\ v_{av}, & \text{if } v_{ff} + \gamma_\beta \cdot v_{ff} > v_{av} \\ -\dfrac{-\gamma_\beta \cdot v_{ff} + v_A}{\gamma_\beta \cdot v_{ff}} \cdot (v_{av}-v_{ff}) + v_{ff} + v_A, & \text{otherwise} \end{cases}$$

if $v_A>\gamma_\beta \cdot v_{ff}$, wherein the first row applies for the range 14, the second row for the range 16, and the third row for the range 15. If $v_A\leq\gamma_\beta \cdot v_{ff}$, the calculation of the ego speed $v_{res}$ is provided by the formula $$v_{res} = \begin{cases} \dfrac{v_A}{\gamma_\beta} \cdot (1+\gamma_\beta), & \text{if } \dfrac{v_A}{\gamma_\beta} \cdot (1+\gamma_\beta) < v_{av} \\ v_{av}, & \text{otherwise} \end{cases}.$$

Lastly, the purpose is explained for the specific predicted ego speed $v_{res}$, i.e., the result shown in FIG. 4 is used. The predictive ego speed $v_{res}$ is thus used by the navigation device 2 for determining the predictive time of arrival at the destination position 7.

The vehicle 1 further comprises the control unit 20, which is set up for autonomous driving operation of the vehicle 1, on the basis of which the predictive ego speed $v_{res}$ is used to predict an energy consumption. Thus, when planning the route 5, intermediate stops can be planned for charging a traction battery of the vehicle 1. Since the vehicle 1 is a hybrid vehicle comprising an electric motor 21 and a combustion motor 22, an intermittent operation of the electric motor 21 and of the combustion motor 22 is controlled or planned on the basis of the prediction of the energy consumption.

Furthermore, the results for the predictive ego speed $v_{res}$ are used in conjunction with control of an exhaust gas aftertreatment device 23 of the vehicle 1, wherein in particular heating and regeneration cycles of the exhaust gas aftertreatment device 23 are planned.

The invention claimed is:

1. A method performed by a control device for determining a predictive ego speed of a vehicle traveling along a predetermined route, the predictive ego speed being for a location or a section of the predetermined route, the method comprising:
    determining a current average speed of road users currently traveling at the location or the section;
    determining a first average speed, the first average speed being an average of speeds of vehicles that have traveled at the location or the section during high traffic density that is indicative of traffic congestion;
    determining a second average speed, the second average speed being an average of speeds of vehicles that have traveled at the location or the section with a traffic density that is indicative of traffic flowing;
    determining if the current average speed is between the first average speed and the second average speed;
    based on determining that the current average speed is between the first average speed and the second average speed, determining the predictive ego speed based on the current average speed and by interpolating between the first average speed and the second average speed; and
    controlling the vehicle autonomously based on the determined predictive ego speed.

2. The method according to claim 1, wherein the interpolating includes using data points, one of which has the first average speed, both as an abscissa value and as an ordinate value.

3. The method according to claim 1, wherein the first average speed is assumed to be a greatest possible value for a speed at which the predictive ego speed of the vehicle corresponds to the speed, and in that the second average speed is assumed to be a smallest possible value for the speed at which the traffic density has no influence on the predictive ego speed of the vehicle.

4. The method according to claim 1, wherein the determining the first average speed and/or the determining the second average speed is based on a free travel speed for the location or the section, wherein the free travel speed is a speed at which the road users travel, on average, without traffic obstructions.

5. The method according to claim 4, wherein the determining the first average speed includes using an inhibition factor, the inhibition factor specifying a relationship between the free travel speed and the first average speed.

6. The method according to claim 5, wherein the inhibition factor is a numerical value from an interval $[-1;0]$, wherein the first average speed is a subsequent addition of the free travel speed and a product of the inhibition factor and the free travel speed.

7. The method according to claim 4, wherein the determining the second average speed includes assuming that the second average speed corresponds to the free travel speed.

8. The method according claim 4, wherein the determining the predictive ego speed includes determining a speed deviation that specifies an expected driver-specific deviation of the predictive ego speed of the vehicle from the free travel speed.

9. The method according to claim 8, wherein the interpolating includes using data points, one of which at least utilizes the second average speed as an abscissa value, and the free travel speed deviating by the speed deviation as an ordinate value.

10. The method according to claim 1, wherein the determining the current average speed includes using at least one item of traffic information is retrieved via an Internet, is retrieved from another vehicle via a Car-to-car connection, and/or is based on one or more empirical values that are retrieved from a data memory, the item of the traffic information describing a current traffic situation and/or a predicted traffic situation.

11. The method according to claim 1, wherein the determining the first average speed and/or the determining the second average speed includes detecting route information for the location or the section, wherein the route information describes a state and/or road class of a route at the location or the section.

12. The method according to claim 1, wherein at least one of determining the current average speed, determining the first average speed, or determining the second average speed includes using artificial intelligence.

13. The method according to claim 1, wherein the method further comprising at least one of determining a predictive time of arrival, predicting an energy consumption of the vehicle, controlling an exhaust gas after treatment device of the vehicle, or controlling an intermittent operation of a combustion motor and an electric motor of the vehicle, the determining, predicting, controlling the exhaust gas, and controlling the intermittent operation include using the predictive ego speed.

14. A control device comprising:
a communication link, wherein the communication link is configured to detect an average speed for a location or a section of a predetermined route along which a vehicle is traveling; and
at least one communication interface, wherein the control device is configured to:
    determine a predictive ego speed of the vehicle traveling along the predetermined route, the predictive ego speed being for the location or the section of the predetermined route;
    determine a current average speed of road users currently traveling at the location or the section;
    determine a first average speed, the first average speed being an average of speeds of vehicles that have traveled at the location or the section during high traffic density that is indicative of traffic congestion;
    determine a second average speed, the second average speed being an average of speeds of vehicles that have traveled at the location or the section with a traffic density that is indicative of traffic flowing;
    determine if the current average speed is between the first average speed and the second average speed;
    based on determining that the current average speed is between the first average speed and the second average speed, determine the predictive ego speed based on the current average speed and by interpolating between the first average speed and the second average speed; and
    control the vehicle autonomously based on the determined predictive ego speed.

15. A navigation unit for a vehicle or mobile user terminal comprising:
a navigation device, wherein the navigation device is configured to:
    determine a predictive ego speed of the vehicle traveling along a predetermined route, the predictive ego speed being for a location or a section of the predetermined route;
    determine a current average speed of road users currently traveling at the location or the section;
    determine a first average speed, the first average speed being an average of speeds of vehicles that have traveled at the location or the section during high traffic density that is indicative of traffic congestion;
    determine a second average speed, the second average speed being an average of speeds of vehicles that have traveled at the location or the section with a traffic density that is indicative of traffic flowing;
    determine if the current average speed is between the first average speed and the second average speed;
    based on determining that the current average speed is between the first average speed and the second average speed, determine the predictive ego speed based on the current average speed and by interpolating between the first average speed and the second average speed; and
    control the vehicle autonomously based on the determined predictive ego speed.

16. A vehicle comprising:
a navigation unit; and
a control device configured to:
    determine a predictive ego speed of the vehicle traveling along a predetermined route, the predictive ego speed being for a location or a section of the predetermined route;
    determine a current average speed of road users currently traveling at the location or the section;
    determine a first average speed, the first average speed being an average of speeds of vehicles that have traveled at the location or the section during high traffic density that is indicative of traffic congestion;
    determine a second average speed, the second average speed being an average of speeds of vehicles that have traveled at the location or the section with a traffic density that is indicative of traffic flowing;
    determine if the current average speed is between the first average speed and the second average speed;
    based on determining that the current average speed is between the first average speed and the second average speed, determine the predictive ego speed based on the current average speed and by interpolating between the first average speed and the second average speed; and
    control the vehicle autonomously based on the determined predictive ego speed.

* * * * *